United States Patent [19]
Siegenthaler

[11] Patent Number: 5,650,034
[45] Date of Patent: Jul. 22, 1997

[54] TRANSFER RING FOR TOROIDAL CARCASSES

[75] Inventor: Karl J. Siegenthaler, Roma-Ostia, Italy

[73] Assignee: Bridgestone Corporation, Tokyo, Japan

[21] Appl. No.: 343,315

[22] Filed: Nov. 22, 1994

[30] Foreign Application Priority Data

Dec. 30, 1993 [IT] Italy .................... TO93A1025

[51] Int. Cl.$^6$ .................................... B29D 30/34
[52] U.S. Cl. .................. 156/396; 156/398; 156/406.2
[58] Field of Search .................... 156/406.2, 126, 156/398, 396, 397, 415, 417, 420

[56] References Cited

U.S. PATENT DOCUMENTS

| | | | |
|---|---|---|---|
| 1,345,995 | 7/1920 | Carlisle . | |
| 4,007,080 | 2/1977 | Klopper | 156/396 |
| 4,190,482 | 2/1980 | Yabe | 156/403 |
| 4,634,489 | 1/1987 | Dupommier | 156/126 |
| 4,685,992 | 8/1987 | Irie | 156/406.2 |
| 5,051,149 | 9/1991 | Ishii | 156/406.2 |
| 5,186,778 | 2/1993 | Okafuji et al. | 156/126 |
| 5,308,432 | 5/1994 | Siegenthaler | 156/397 |
| 5,380,384 | 1/1995 | Tokunaga et al. | 156/406.2 |

FOREIGN PATENT DOCUMENTS 0169162   7/1985   European Pat. Off. .

*Primary Examiner*—Geoffrey L. Knable
*Attorney, Agent, or Firm*—Carmen S. Santa Maria

[57] ABSTRACT

A transfer ring (1) for toroidal carcasses (2), wherein a number of first actuators (17) provide for radially moving a number of sectors (19) to and from a position which forms a grab ring (20) for cooperating with an intermediate annular portion (7) of the carcass (2). A number of second actuators (35) provide for moving a number of clamping devices (34) to and from a closed position engaging the beads (3) of the carcass (2). Each sector (19) and each clamping device (34) presents respective magnetic retaining elements (22, 44), respectively cooperating with the intermediate annular portion (7) and the beads (3) of the carcass (2).

8 Claims, 4 Drawing Sheets

TRANSFER RING FOR TOROIDAL CARCASSES

BACKGROUND OF THE INVENTION

1. Technical Field

The present invention relates to a transfer ring for toroidal carcasses.

2. Background Information

European Patent Application publication n. 0549868 relates to the formation of a toroidal carcass comprising two beads with respective fillers; two sidewalls, each defined by a succession of loops formed using at least one cord and enclosing a respective bead and filler; and an intermediate annular portion preferably reinforced externally by a tread belt normally comprising reinforcing wires.

SUMMARY OF THE INVENTION

It is an object of the present invention to provide a device for removing such a carcass without deforming it, the carcass being in itself unstable in shape, off the machine on which it is formed, and transferring it to follow-up machines, such as a building drum, for completing the carcass and producing a finished green tire.

According to the present invention, there is provided a transfer ring for toroidal carcasses comprising two beads and an intermediate annular portion; characterized by the fact that it comprises a number of mutually cooperating sectors for forming a grab ring for said intermediate annular portion; a number of first actuating means connected to and for radially moving said sectors, in relation to the axis of the grab ring, to and from a position forming the grab ring; a number of clamping means movable to and from a closed position engaging the beads of the toroidal carcass; and a number of second actuating means for moving the clamping means to and from said closed position; each sector and each clamping means comprising respective first and second retaining means cooperating respectively with said intermediate annular portion and said beads.

According to a preferred embodiment of the above transfer ring, said first and second retaining means are magnetic.

The above transfer ring preferably also comprises a number of third actuating means connected to and for radially moving the clamping means to and from an operating position wherein the clamping means may be moved by the second actuating means to and from said closed position.

BRIEF DESCRIPTION OF THE DRAWINGS

A non-limiting embodiment of the present invention will be described by way of example with reference to the accompanying drawings, in which.

DESCRIPTION OF THE PREFERRED EMBODIMENT

Figure 1:
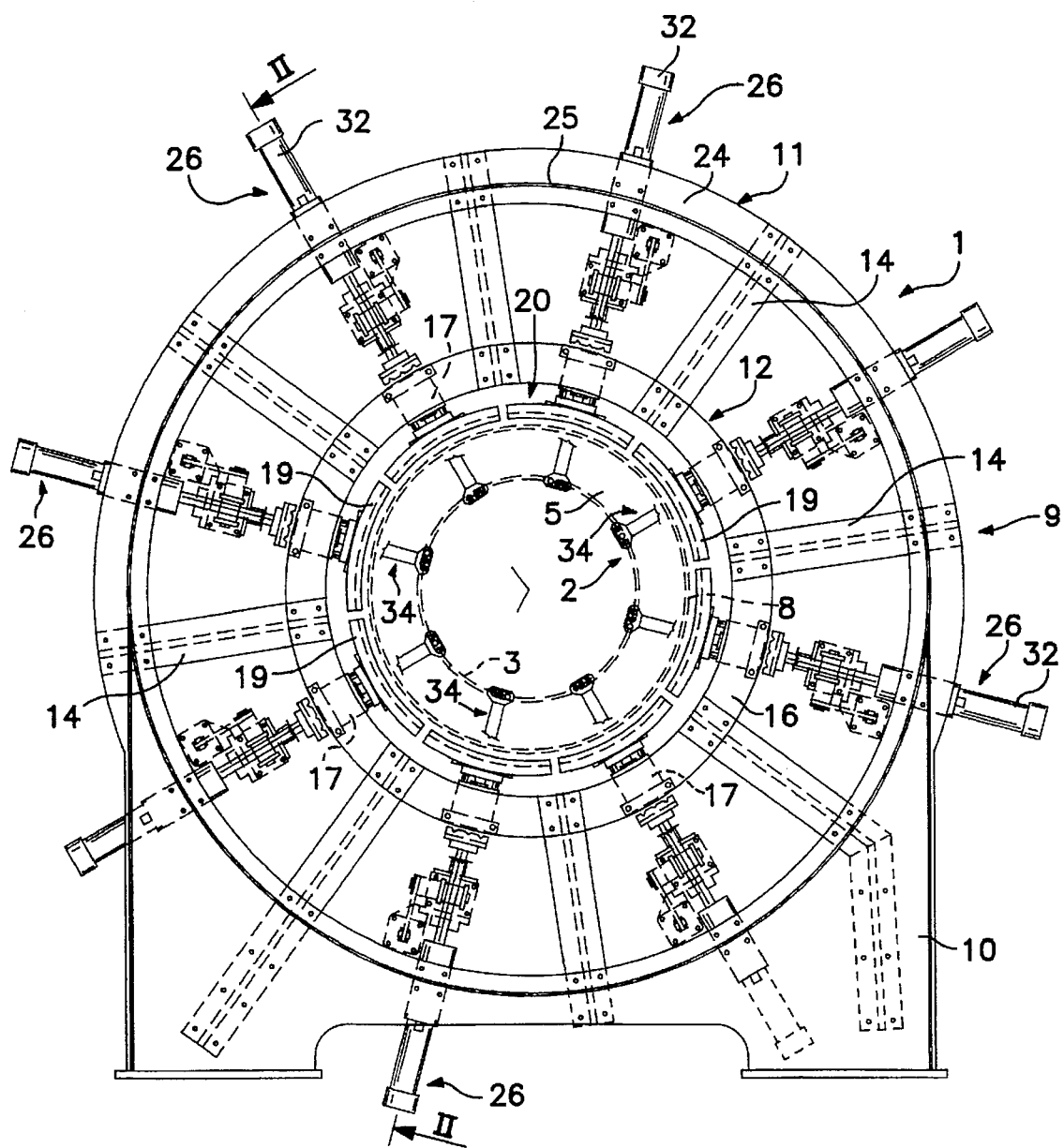
FIG. 1 shows a side view of a preferred embodiment of the transfer ring according to the present invention.

Number 1 in FIG. 1 indicates a transfer ring for a carcass 2 formed as described in European Patent Application no. 0549868 comprising two beads 3 with respective fillers 4; two sidewalls 5, each defined by a succession of loops 6 formed using at least one cord and enclosing a respective bead 3 and respective filler 4; and an intermediate portion 7 reinforced externally by a tread belt 8 preferably comprising reinforcing wires (not shown).

Transfer ring 1 comprises a frame 9, in turn comprising a base 10 mountable on rails (not shown), an outer ring 11, the bottom portion of which is defined by the top portion of base 10, and an inner ring 12. Rings 11 and 12 are substantially circular with the second extending inside the first, about the same axis 13, and are both connected by a number of radial rods 14.

Ring 12 presents a substantially C-shaped section with its concavity facing axis 13, and is defined by a substantially cylindrical core 15 reinforced at opposite ends by two annular wings 16 coaxial with axis 13. Core 15 is fitted integral with linear actuators 17, equally spaced about axis 13. Each actuator 17 presents a radial output rod 18 facing axis 13 and is fitted on its free end with a sector 19 movable by respective actuator 17 between an idle outer position and an inner work position wherein the opposite ends of sector 19 contact respective ends of two adjacent sectors 19 to define a grab ring 20 surrounding the outer periphery of intermediate portion 7 of carcass 2. Along its inner surface 21, each sector 19 presents a number of permanent magnets 22 which cooperate with the reinforcing wires (not shown) of tread belt 8 for maintaining belt 8 in a perfectly circular position on the inner surface of grab ring 20. In the event belt 8 is absent or not provided with reinforcing wires, intermediate portion 7 is positioned contacting the inner surface of grab ring 20 by a segmented auxiliary metal ring 23 which is fitted manually inside carcass 2, and cooperates with magnets 22 for maintaining carcass 2 in a position contacting the inner surface of grab ring 20.

Alternatively, according to a variation not shown, magnets 22 are replaced by known suction devices connected to a suction pump.

Figure 3:
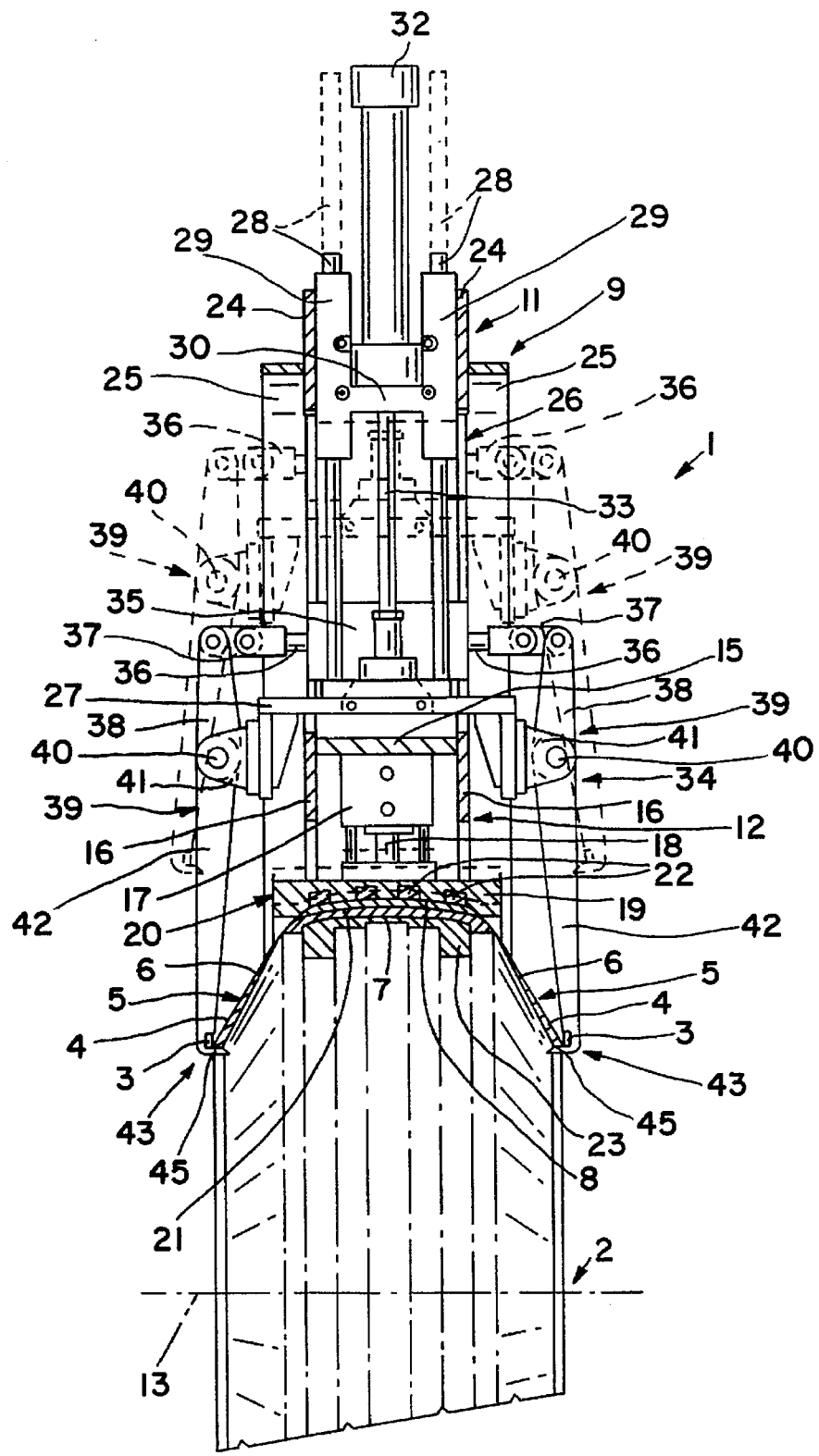
FIG. 3 shows a larger-scale view of a detail in FIG. 2.
Figure 4:
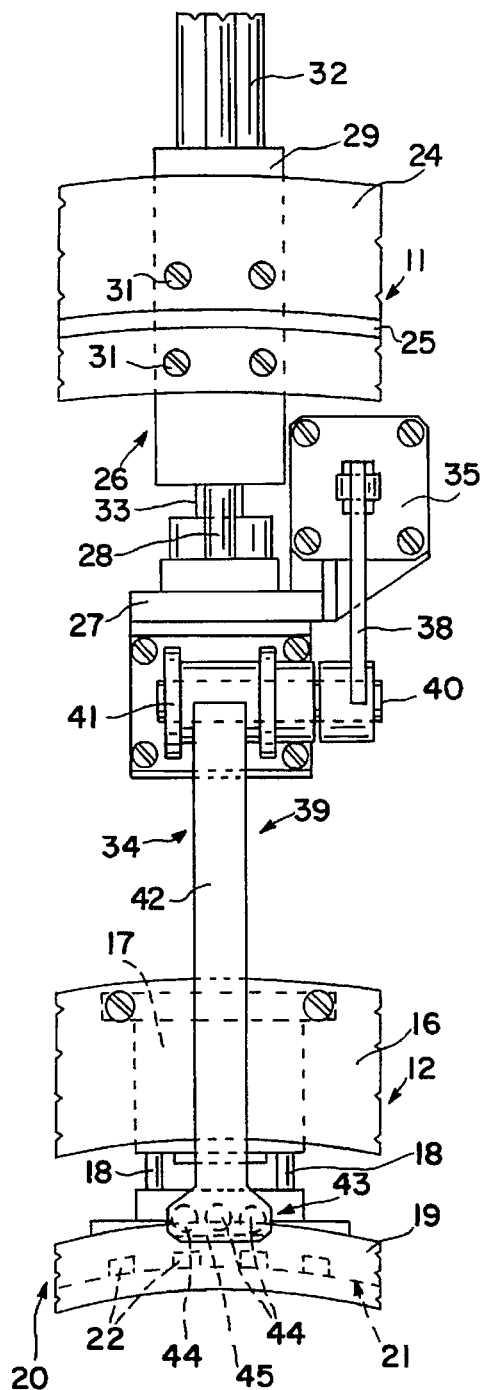
FIGS. 4 and 5 show larger-scale side views of a detail in FIGS. 2 and 3 in two different operating positions.
Figure 5:
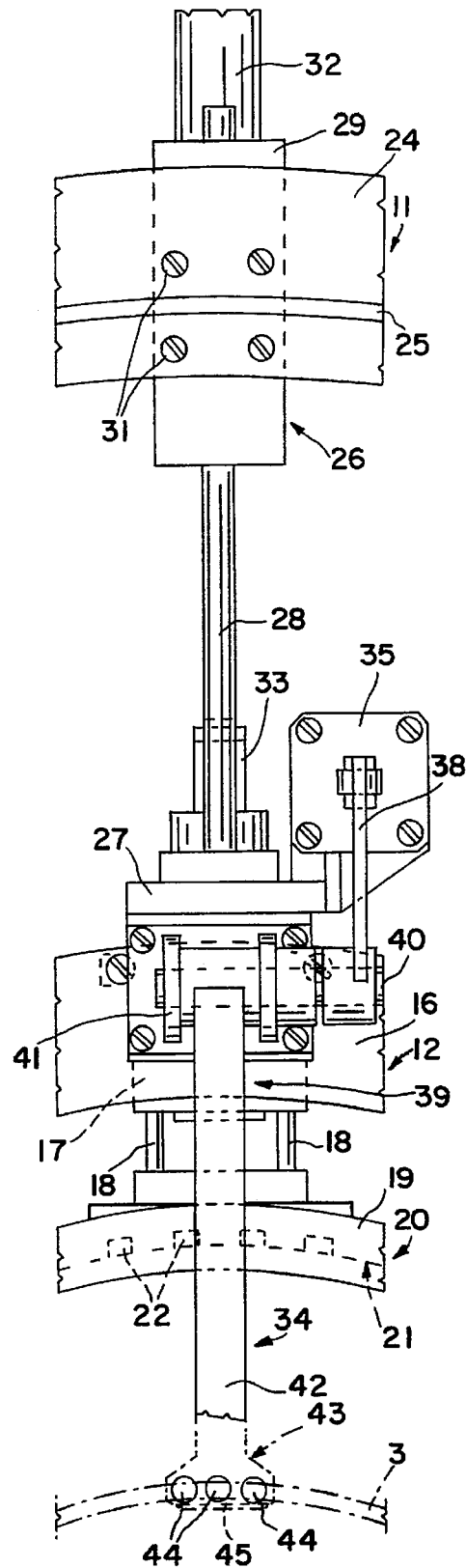

As shown more clearly in FIGS. 3, 4 and 5, outer ring 11 comprises two side-by-side annular wings 24 coaxial with axis 13, reinforced by respective cylindrical outer cores 25, and made integral with each other by a number of actuating units 26 equally spaced about axis 13. Each actuating unit 26 comprises a plate 27 fitted with two parallel rods 28 which engage in a sliding manner respective radial sleeves 29 that are connected to each other by a crosspiece 30 and interposed between wings 24 to which they are connected by means of a number of screws 31. Each actuating unit 26 also comprises a linear actuator 32 supported radially in relation to axis 13 by a respective crosspiece 30. Actuator 32 has an output rod 33 connected by its free end integral with plate 27, which provides for moving plate 27 radially in relation to axis 13, between an idle outer position and an inner operating position (FIGS. 3 and 5), wherein plate 27 is positioned directly outwards of inner ring 12.

Each plate 27 supports a respective clamping device 34 activated by a double cylinder 35 having two coaxial output rods 36 parallel to axis 13. Each rod 36 is hinged, via the interposition of a connecting rod 37, to the free end of a first arm 38 of a respective rocker arm 39, an intermediate point of which pivots on a pin 40 fitted to a bracket 41 integral with plate 27 and extending perpendicular to axis 13. Each rocker arm 39 comprises a second arm 42 extending substantially radially towards axis 13, and presenting on its free end, a clamping head 43 with a number of magnets 44 cooperating with a respective bead 3, and an end plate 45 perpendicular to arm 42 and cooperating with the inner surface of bead 3. The length of arm 42 is such that, when plate 27 is in the idle outer position, respective head 43 is positioned outwards of grab ring 20; and, when plate 27 is in the inner operating position, head 43 is so positioned as to clamp respective bead 3, i.e., with bead 3 resting on plate 45 and contacting magnets 44.

In actual use, ring 1 is initially set to the idle position for receiving carcass 2 which is inserted inside ring 1 by the machine (known and not shown) on which carcass 2 is formed. When ring 1 is in the idle position, sectors 19 are maintained in the idle outer position by respective actuators 17, for enabling trouble-free insertion of carcass 2 between sectors 19 and coaxially with axis 13. Actuating units 26 are set to the idle outer position (FIG. 4) so that clamping heads 43 of respective clamping devices 34 are maintained radially outwards of sectors 19 in relation to axis 13, again for enabling trouble-free insertion of carcass 2 between sectors 19, and clamping devices 34 are set to the open position.

Once carcass 2 is inserted between sectors 19, ring 1 is set to the operating position wherein it supports carcass 2 and externally provides for ensuring a given stability in the shape of the carcass. For this purpose, actuators 17 are operated for moving sectors 19 into the inner work position, after first, if necessary, fitting ring 23 inside intermediate portion 7 of carcass 2. At the same time, actuators 32 are operated for moving actuating units 26 into the inner operating position (FIG. 5) wherein heads 43 are set to the clamping position facing respective beads 3. Finally, cylinders 35 are operated for moving devices 34 from the open position (shown by the dotted line in FIG. 3) to the closed position (shown by the continuous line in FIG. 3) wherein the magnets of each head 43 contact the lateral surface of respective bead 3, and plate 45 of each head 43 contacts the inner surface of respective bead 3.

Figure 2:
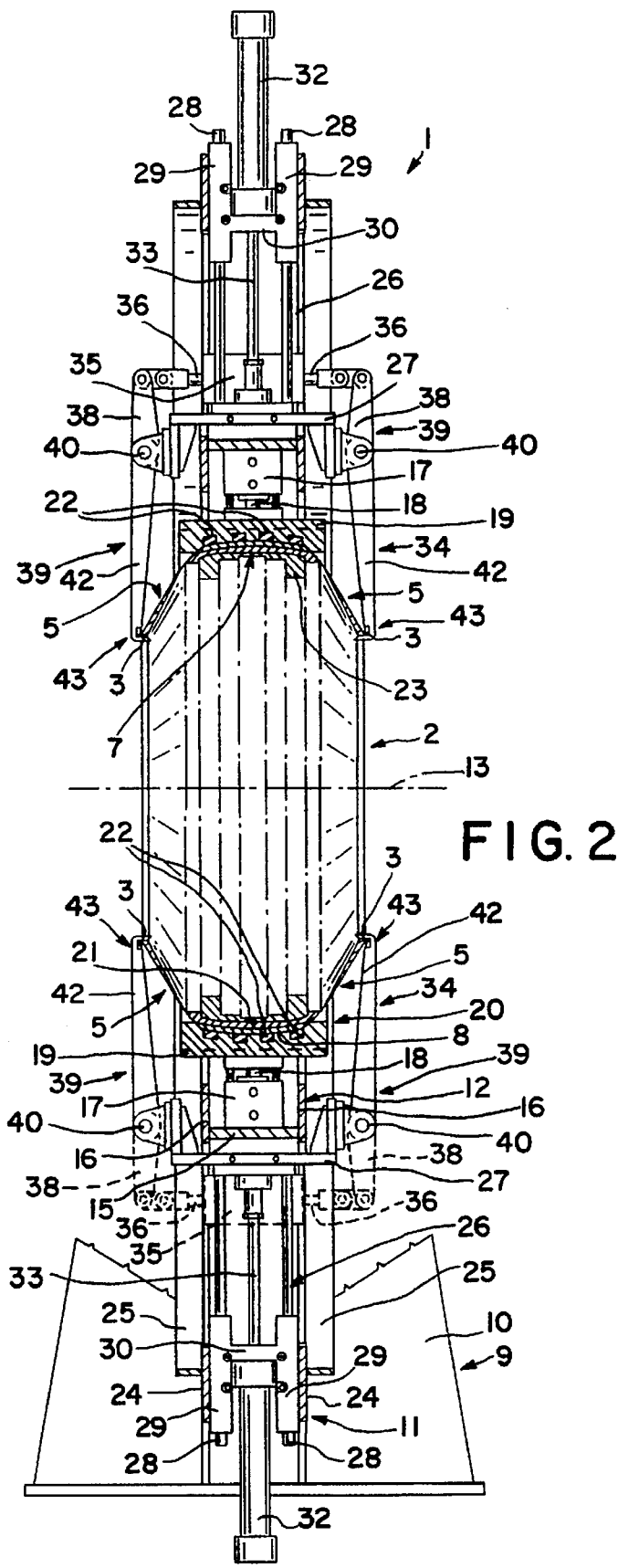
FIG. 2 shows a section along line II—II in FIG. 1.

In other words, as shown clearly in FIG. 2, ring 1 in the operating position defines a rigid cage comprising a first outer annular support, defined by grab ring 20, for intermediate portion 7 of carcass 2. The two rings of the second supports are located on either side of the first support, coaxial with the first support and axis 13, symmetrical in relation to the first support, defined by clamping devices 34, and each supporting a respective bead 3 in a given position coaxial with intermediate portion 7.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

I claim:

1. A transfer ring for preformed toroidal carcasses having two beads and an intermediate annular portion, said ring comprising:

a number of mutually cooperating sectors for forming a grab ring for said intermediate annular portion;

a number of first actuating means connected to said sectors for radially moving said sectors in relation to an axis of the grab ring, to and from a position forming the grab ring;

a number of clamping means movable to and from a closed position for engaging the beads of the preformed toroidal carcass when the beads are positioned radially inwardly of the intermediate annular portion whereby the intermediate annular portion is adapted to extend radially outwardly from the beads when the clamping means is in said closed position;

a number of second actuating means for moving the clamping means to and from said closed position; each sector and each clamping means comprising respective first and second retaining means cooperating respectively with said intermediate annular portion and said beads whereby the first retaining means contacts the intermediate annular portion radially outwardly of the second retaining means; and a number of third actuating means connected to the clamping means for moving the clamping means radially in relation to said axis, to and from an operating position and substantially parallel to a direction of movement of the first actuating means.

2. A transfer ring as claimed in claim 1 in which said first and second retaining means are magnetic.

3. A transfer ring as claimed in claim 2, further comprising a removable auxiliary metal ring insertable inside said intermediate annular portion, facing said sectors and coaxial with said axis.

4. A transfer ring as claimed in claim 3, in which a first outer annular support is defined by the grab ring for said intermediate annular portion; in which the clamping means defines a pair of second supports located on either side of the first outer annular support, and is coaxial with the first outer annular support and said axis and is symmetrical in relation to the first outer annular support; each ring of the second supports supporting a respective one of said beads in a given position coaxial with the intermediate annular portion when the second actuator means is in the closed position and the third actuating means is in the operating position.

5. A transfer ring as claimed in claim 4, in which each of said third actuating means comprises a linear actuator and a plate connected to an output of the linear actuator; said plate supporting a respective one of said second actuating means and a respective one of said clamping means.

6. A transfer ring as claimed in claim 5, in which each of the clamping means comprises a pair of rocker arms on either side of and pivoting on a respective one of said plates; each rocker arm extending substantially radially in relation to said axis, and comprising a first and a second arm on either side of said plate; each second actuating means being supported by a respective one of said plates, and presenting two outputs connected to the first arms of a respective pair of said rocker arms; and each of said second arms presenting, on its free end, a clamping head comprising a respective one of said second retaining means.

7. A transfer ring as claimed in claim 6, in which each of said clamping heads comprises a transverse end plate for cooperating with an inner surface of a respective one of said beads; said second retaining means comprising, for each clamping head, a number of magnets for cooperating with the lateral surface of a respective one of said beads.

8. A transfer ring as claimed in claim 3 further comprising a frame having a stationary outer ring and a stationary inner ring coaxial with each other and with said axis; and in which the outer ring supports the third actuating means, and the inner ring supports the first actuating means.

* * * * *